(12) United States Patent
Chenault

(10) Patent No.: US 6,209,833 B1
(45) Date of Patent: Apr. 3, 2001

(54) BOLT-ON OIL PUMP PICK-UP RETAINER

(76) Inventor: Bruce W. Chenault, 2355 Central Dr., Beaumont, TX (US) 77706

( * ) Notice: Subject to any disclaimer, the term of this patent is extended or adjusted under 35 U.S.C. 154(b) by 0 days.

(21) Appl. No.: 09/288,914

(22) Filed: Apr. 9, 1999

(51) Int. Cl.[7] .............................. A47B 96/06; E04G 3/00; F16B 1/00; G09F 7/18
(52) U.S. Cl. ........................ 248/230.8; 248/58; 248/62; 248/74.1
(58) Field of Search .................... 248/230.8, 58, 248/62, 74.1

(56) References Cited

U.S. PATENT DOCUMENTS

| | | | | |
|---|---|---|---|---|
| 4,787,768 | * | 11/1988 | Lange | 248/231.2 |
| 5,295,646 | * | 3/1994 | Roth | 248/58 |
| 5,344,111 | * | 9/1994 | Gantzert | 248/74.1 |

* cited by examiner

Primary Examiner—Leslie A. Braun
Assistant Examiner—A. Joseph Wujciak

(57) ABSTRACT

A sheetmetal stamping (1) attaching with holes (7) which corresponds with existing bolts (6) to an oil pump. Opposite the attaching holes (7) is an open ended loop (2) which is part of sheetmetal stamping (1). This loop (2) encircles the oil pump pick-up tube (15). The loop (2) has corresponding holes (10) and (13) above a clamp bolt (9) to pass and a nut (8) to tighten and clamp the oil pump pick-up tube securely in place.

2 Claims, 3 Drawing Sheets

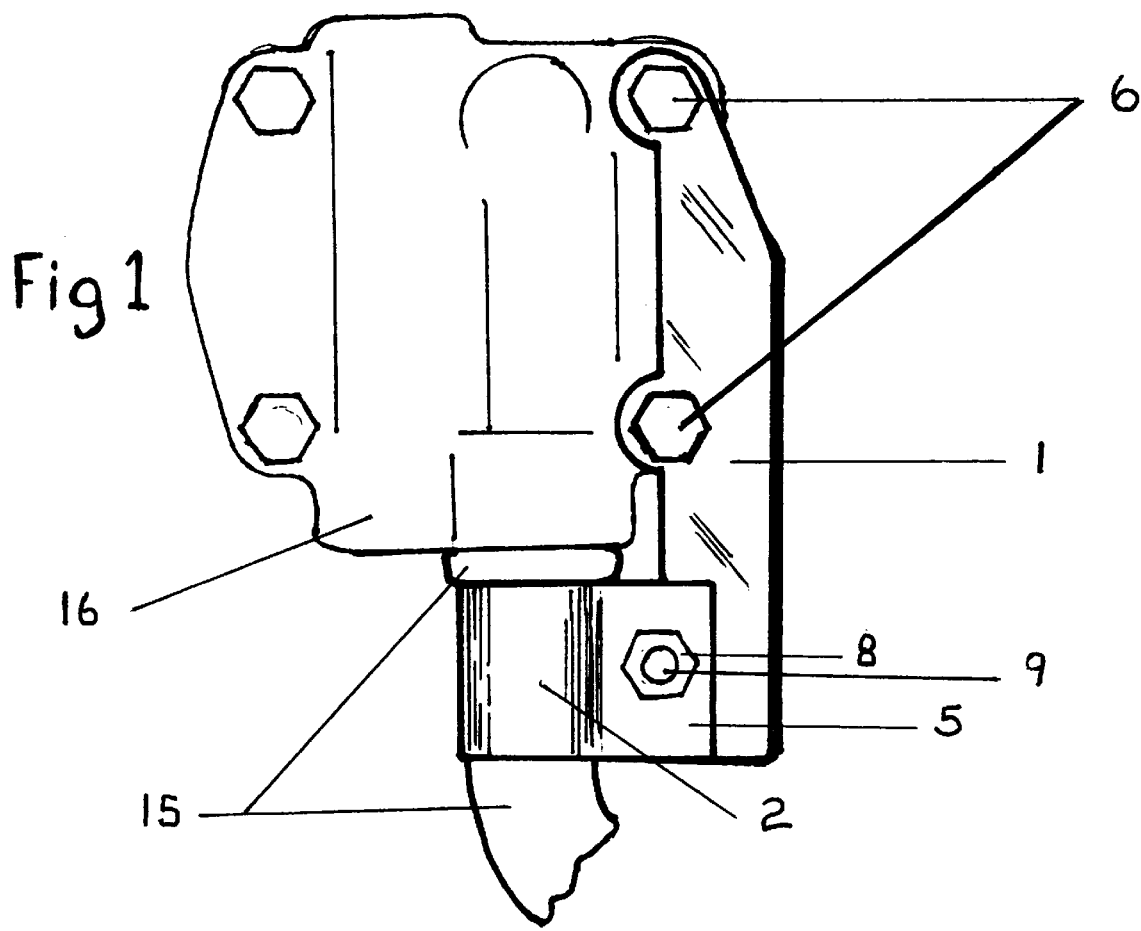
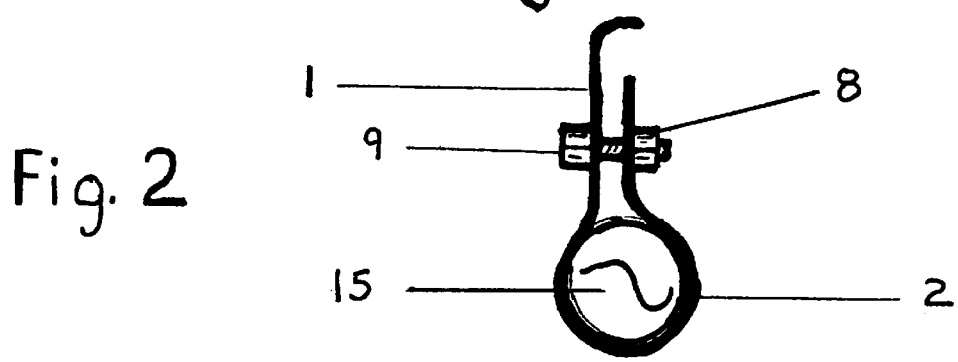

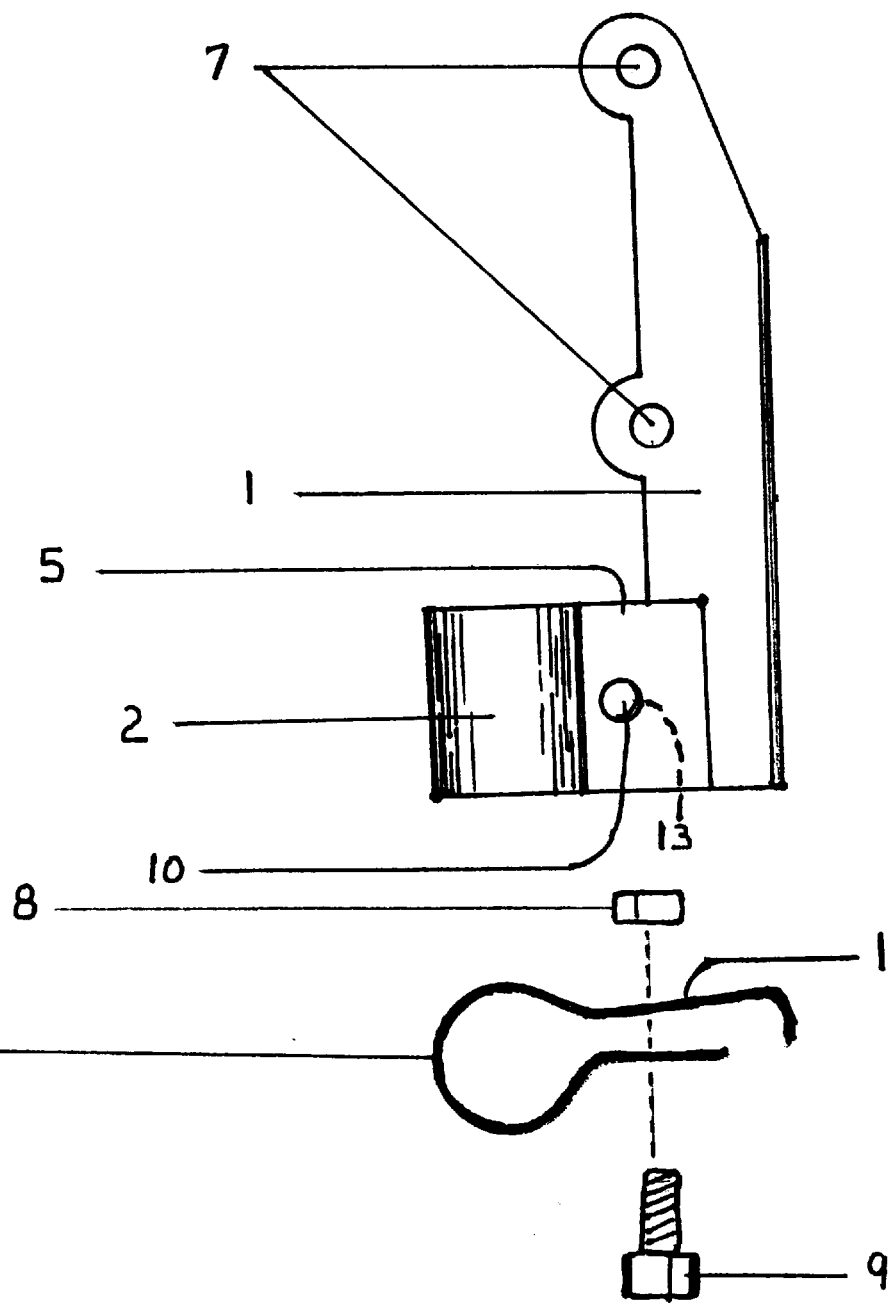

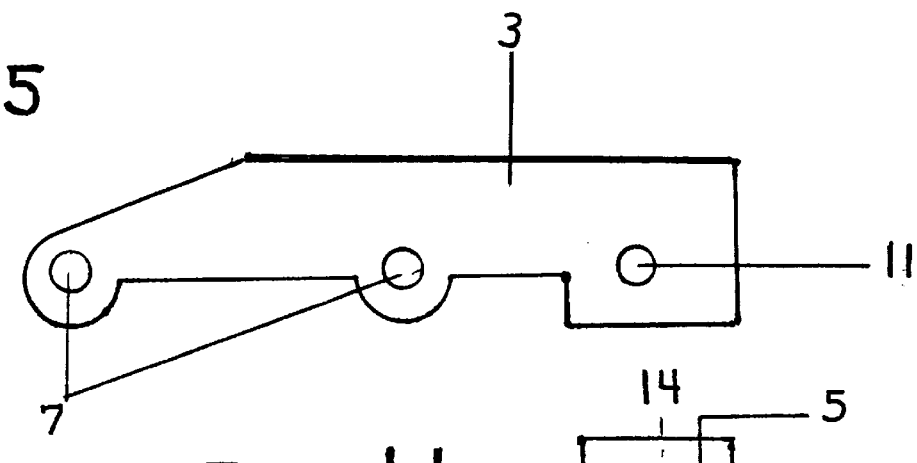
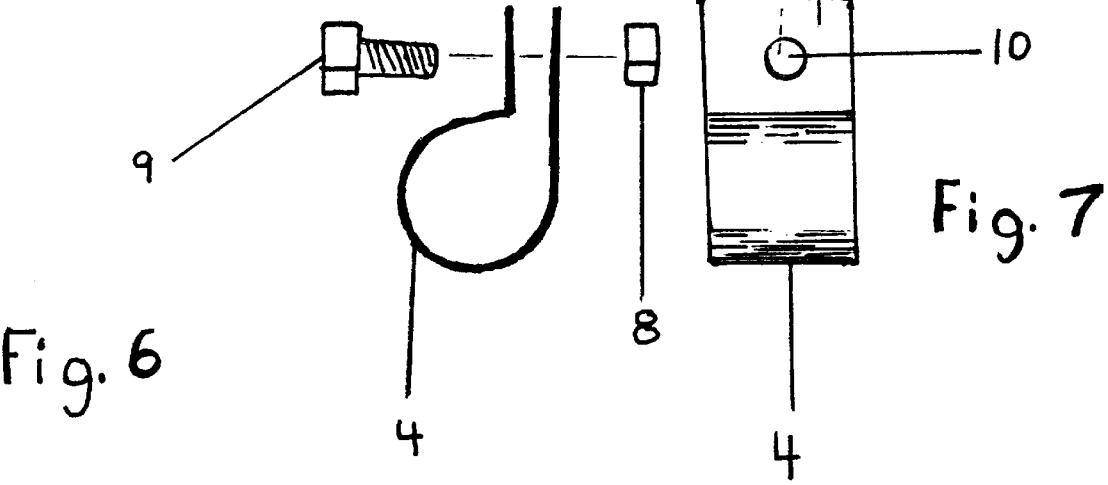

BOLT-ON OIL PUMP PICK-UP RETAINER

CROSS-REFERENCE TO RELATED APPLICATIONS

Not Applicable

BACKGROUND

1. Field of Invention

This invention relates to securing CHEVROLET V8 type oil pump parts, specifically the pick-up tube to the oil pump body.

BACKGROUND

2. Description of Prior Art Many GENERAL MOTORS engines, particularly CHEVROLET Built, use oil pumps in which the pick-up tube or strainer is press fit to the oil pump body. The fitting process used at the factory works well enough and there are few problems with new vehicle engines.

A defect in this design manifests itself in the after market where the oil pump and pick-up tube, are sold separately. A good press fit is not always accomplished. It is not uncommon for the pick-up screen to disengage from the oil pump. The resulting loss of oil pressure usually leads to catastrophic engine damage and failure. This is a common problem in rebuilt engines, especially high performance.

A common remedy, is brazing or tack welding the pick-up tube to the pump. There are several drawbacks to this solution. The oil pump is cast iron and the pick-up tube is mild steel. These dissimilar metals require a high degree of skill to properly tack weld or braze. The heat required to braze or tack weld can easily damage the pump or pick-up or both. Because of the dissimilarity of the metals the parts may seem to be welded but not actually welded. Brazing or welding is time consuming and the parts must be allowed to cool before installing. Welding or brazing actually voids the warranty on the parts.

SUMMARY

In accordance with the present invention, the retainer comprises a formed sheet metal clamp. This formed clamp bolts to the oil pump by existing bolts on the oil pump. The other end loops around the oil pump pick-up tube. The looped portion has holes, which allow a bolt and nut. The bolt and nut are tightened to securely clamp the oil pump pick-up tube in place.

OBJECTS AND ADVANTAGES

Accordingly, besides the objects and advantages of, the bolt-on oil pump pick-up retainer, described in my above patent, several objects and advantages are:

A. To provide an inexpensive remedy for disengagement of press fit oil pick-up tubes.
B. To require no special skills
C. To require no special equipment
D. To provide quick and easy installation
E. To provide security without modifying pump or pick-up Further objects and advantages are that the retainer is reusable and simple to manufacture.

DRAWING FIGURES

FIG. 1:
Shows an assembled view of the retainer installed on a typical oil pump, with the screen removed for clarity.

FIG. 2:
Shows an end view of the retainer installed.

FIG. 3:
Shows the sheetmetal retainer without the clamp bolt and nut.

FIG. 4:
Shows an end view with the bolt and nut removed.

FIG. 5:
Shows a bracket for a second version with a separate loop.

FIG. 6:
Shows an end view of the detached loop with bolt and nut.

FIG. 7:
Shows the top view of the detached loop.

REFERENCE: NUMERALS IN DRAWINGS (1) Retainer bracket
(2) Retainer loop; part of (1)
(3) Retainer bracket for detached loop design
(4) Detached loop
(5) Loop tab; part of (2) and (4)
(6) Existing oil pump bolts
(7) Holes in retainer bracket for attachment to oil pump
(8) Nut
(9) Clamp Bolt
(10) Hole for clamp bolt
(11) Hole for attaching separate loop to bracket
(12) Hole for clamp bolt in separate loop
(13) Corresponding hole for hole(10)
(14) Corresponding hole for hole(12)
(15) Pick-up; abbreviated for clarity
(16) Oil pump

DESCRIPTION FIGS. 1–4

Preferred Embodiment

A preferred embodiment of the present invention is illustrated in FIG. A, assembled and installed, FIG. B assembled end view, FIG. C unassembled top view, FIG. E unassembled end view. The sheetmetal bracket (1) is attached to the oil pump (16), by existing oil pump bolts (6). At the end opposite the attaching bolts (6) is an open ended loop (2) has a tab (5) at its open side which has a hole (10) which corresponds with hole (13). The clamp bolt (9) passes through these holes and uses a nut (8) to clamp the loop securely around the oil pump pick-up tube (15) preventing disengagement.

DESCRIPTION FIGS. 5–7

Additional Embodiments

Additional embodiments in FIGS. E,F, and G. The illustration in FIG. E shows retainer bracket (3), retainer attachment holes 97), and loop attachment hole (11). Bracket (3) has no retainer loop (2). FIG. F shows an end view of detached open ended loop (4) and clamp bolt (9) and nut (8) relationship. FIG. G shows top view of detached loop (4)

and thru hole (12) and corresponding hole (14) and thru hole in detached open ended loop (4) as well as loop tab (5). The retainer bracket (3) attaches to the oil pump with existing bolts (2). The detached open ended loop encircles the oil pump pick-up tube (15). The clamp bolt (9) passes thru holes (12) and (14) in the detached loop (4) and thru hole (11) in the retainer bracket (3). Thru the use of clamp bolt (9) and nut (8) the pick-up tube (15) is clamped securely and retained by the bracket (3) at the same time. This embodiment allows for different loop configurations for various applications using a basic bracket configuration.

What is claimed is:

1. A one-piece unitary bracket for an oil pump pick up retainer comprising, a formed metal bracket comprising a flat elongated arm and an open ended loop extending perpendicularly from said elongated arm; said elongated arm having an arcuate top edge and two side edges; said elongated arm including a plurality of holes for attachment to an oil pump and a flange extending substantially perpendicular from at least one side of said elongated arm; and said open ended loop including holes for receiving a clamped bolt therethrough whereby said open ended loop is adapted to be secured to a tube and said flat elongated arms is adapted to be secured to said oil pump.

2. The bracket for the oil pump pick up retainer of claim 1, wherein said open ended loop is adapted to have a nut threadedly fastened to said clamped bolt.

* * * * *